United States Patent
Shinagawa

(10) Patent No.: US 9,082,193 B2
(45) Date of Patent: Jul. 14, 2015

(54) SHAPE-BASED IMAGE SEGMENTATION

(71) Applicant: Siemens Medical Solutions USA, Inc., Malvern, PA (US)

(72) Inventor: Yoshihisa Shinagawa, Downingtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/253,915

(22) Filed: Apr. 16, 2014

(65) Prior Publication Data

US 2014/0314294 A1  Oct. 23, 2014

Related U.S. Application Data

(60) Provisional application No. 61/813,710, filed on Apr. 19, 2013.

(51) Int. Cl.
  *G06K 9/00* (2006.01)
  *G06T 7/00* (2006.01)
  *G21K 5/00* (2006.01)

(52) U.S. Cl.
  CPC ............. *G06T 7/0083* (2013.01); *G06T 7/0087* (2013.01); *G06T 7/0089* (2013.01); *G06T 2207/20124* (2013.01); *G06T 2207/30004* (2013.01)

(58) Field of Classification Search
  USPC ......... 382/100, 103, 106, 128–134, 154, 162, 382/168, 173, 181, 199, 203, 219, 232.254, 382/274, 276, 291, 305; 378/4, 21, 35; 600/476; 324/309; 250/363.09
  See application file for complete search history.

(56) References Cited

U.S. PATENT DOCUMENTS

| | | | |
|---|---|---|---|
| 7,876,938 B2 * | 1/2011 | Huang et al. .................. | 382/128 |
| 8,299,438 B2 * | 10/2012 | Fenchel et al. ........... | 250/363.09 |
| 2007/0081706 A1 * | 4/2007 | Zhou et al. .................... | 382/128 |
| 2011/0187364 A1 * | 8/2011 | Blumhagen et al. .......... | 324/309 |
| 2013/0060146 A1 * | 3/2013 | Yang et al. .................... | 600/476 |

* cited by examiner

*Primary Examiner* — Seyed Azarian
(74) *Attorney, Agent, or Firm* — Peter R. Withstandley

(57) ABSTRACT

Systems and methods are provided for image segmentation. In accordance with some implementations, a current segmentation mask associated with an object of interest is iteratively refined. Any image element associated with a previously generated fence is excluded from the current segmentation mask. The fence may be generated around one or more image elements that violate a shape constraint.

19 Claims, 6 Drawing Sheets

SHAPE-BASED IMAGE SEGMENTATION

CROSS-REFERENCE TO RELATED APPLICATION

The present application claims the benefit of U.S. provisional application No. 61/813,710 filed on Apr. 19, 2013, the entire contents of which are herein incorporated by reference.

TECHNICAL FIELD

The present disclosure generally relates to image segmentation, and more particularly, to image segmentation based on shapes.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of large amount of image data generated by such modern medical scanners, there has been and remains a need for developing image processing techniques that can automate some or all of the processes to determine the presence of anatomical abnormalities in scanned medical images.

Digital medical images are constructed using raw image data obtained from a scanner, for example, a CAT scanner, MRI, etc. Digital medical images are typically either a two-dimensional ("2-D") image made of pixel elements or a three-dimensional ("3-D") image made of volume elements ("voxels"). Such 2-D or 3-D images are processed using medical image recognition techniques to determine the presence of anatomical structures such as cysts, tumors, polyps, etc. Given the amount of image data generated by any given image scan, it is preferable that an automatic technique should point out anatomical features in the selected regions of an image to a doctor for further diagnosis of any disease or condition.

Automatic image processing and recognition of structures within a medical image is generally referred to as Computer-Aided Detection (CAD). A CAD system can process medical images and identify anatomical structures including possible abnormalities for further review. Such possible abnormalities are often called candidates and are considered to be generated by the CAD system based upon the medical images.

One process often involved in CAD systems is the segmentation of medical images. Image segmentation is the process of partitioning an image into multiple segments. Image segmentation is typically used to locate objects of interest (e.g., abnormalities such as lesions) as candidates for further review.

One type of image segmentation technology is region-based, which is also classified as a pixel-based image segmentation since it involves the selection of initial seed points. Region growing is the simplest region-based segmentation that groups pixels or sub-regions into larger regions based on a pre-defined criteria. The pixel aggregation starts with an initial set of "seed" points, and regions are then grown from these seed points to adjacent points that have similar properties (e.g., gray level, texture, color, shape, etc.).

Pixel-based segmentation (e.g., region growing) is fast, conceptually simple, and better than, for example, edge-based techniques in noisy images where edges are difficult to detect. However, pixel-based segmentation methods do not have global shape information when processing each pixel locally. Therefore, at each iteration, the segmentation process only makes a decision whether the pixel in question should be included in the segmentation mask and processes that pixel's neighboring pixels recursively. The segmentation results are prone to "leaks" or "bleed-through" artifacts in which the segmentation mask floods outside the object of interest and the boundary between objects are blurry or not clearly distinguishable. This can cause the segmentation method to, for example, erroneously categorize healthy tissue as part of an abnormality (e.g., lesion).

Therefore, there is a need for improved systems and methods for pixel-based segmentation algorithms to prevent segmentation leakage.

SUMMARY

Described herein are systems and methods for image segmentation. In accordance with one aspect, a current segmentation mask associated with an object of interest is iteratively refined. Any image element associated with a previously generated fence is excluded from the current segmentation mask. The fence may be generated around one or more image elements that violate a shape constraint.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
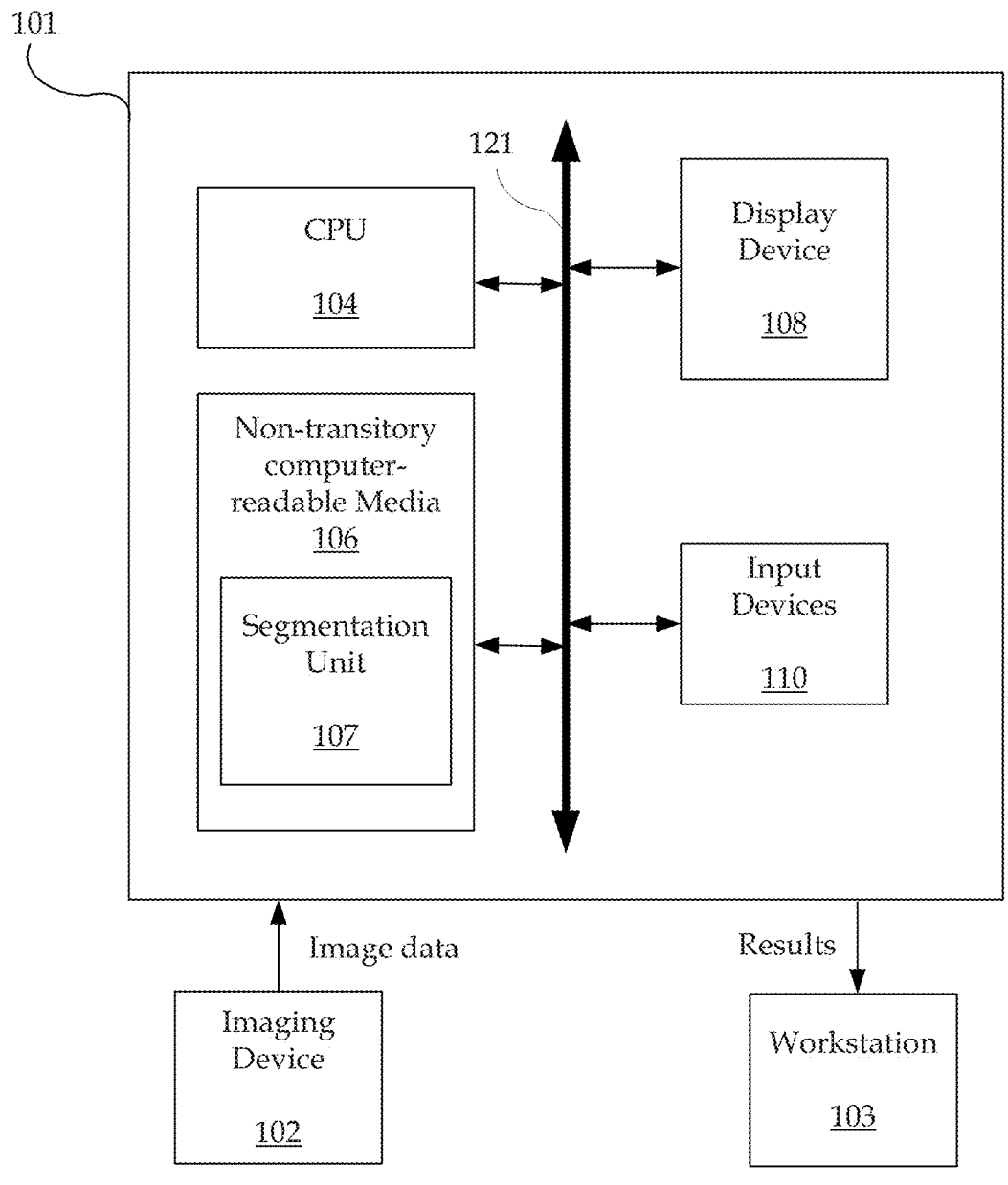
FIG. 1 is a block diagram illustrating an exemplary system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The term "image element" is used to refer to a smallest addressable element in image data, such as a pixel or voxel. The terms "pixels" for picture elements, conventionally used with respect to 2-D imaging and image display, and "voxels" for volume image elements, often used with respect to 3-D imaging, can be used interchangeably. It should be noted that the 3-D volume image is itself synthesized from image data obtained as pixels on a 2-D sensor array and displays as a 2-D image from some angle of view. Thus, 2-D image processing and image analysis techniques can be applied to the 3-D volume image data. In the description that follows, techniques described as operating upon pixels may alternately be described as operating upon the 3-D voxel data that is stored and represented in the form of 2-D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel" or "subject voxel" are used to indicate a particular image element as it is operated upon using techniques described herein.

The present framework relates to automated or semi-automated analysis of digital or digitized images. More particularly, the present framework employs shape priors to help prevent or minimize segmentation leakage. A "shape prior" generally refers to knowledge of a partial or entire predicted shape that is used to constrain the image segmentation method, such as the probability distribution of a measurement, e.g., the area and perimeter of the shape. In accordance with one implementation, one or more fences may be set up in the vicinity of image elements (e.g., pixels or voxels) at the growing segmentation boundary (or frontier) that violate shape constraints. Such fences serve to exclude neighboring pixels (or voxels) from the region growing process, so as to prevent possible segmentation leakage. The present framework is advantageously able to accommodate segmentation of complex shapes, including multi-component shapes such as bone tumors. These and other exemplary advantages and features will be described in more detail in the following description.

It is understood that while a particular application directed to region growing-based segmentation may be shown, the technology is not limited to the specific implementations illustrated. The present technology has application to, for example, other types of segmentation methods, such as those based on using a partial differential equation (PDE) and solving the PDE by a numerical scheme. PDE-based segmentation typically employs curve evolution or propagation techniques to delineate the segmentation mask. Examples of PDE-based segmentation include active contour model (or snakes) and level set methods. Other methods are also useful.

FIG. 1 is a block diagram illustrating an exemplary system 100. The system 100 includes a computer system 101 for implementing the framework as described herein. Computer system 101 may be a desktop personal computer, a portable laptop computer, another portable device, a mini-computer, a mainframe computer, a server, a storage system, a dedicated digital appliance, a communication device, or another device having a storage sub-system configured to store a collection of digital data items. In some implementations, computer system 101 operates as a standalone device. In other implementations, computer system 101 may be connected (e.g., using a network) to other machines, such as imaging device 102 and workstation 103. In a networked deployment, computer system 101 may operate in the capacity of a server (e.g., thin-client server, such as Syngo®. via by Siemens Healthcare), a client user machine in server-client user network environment, or as a peer machine in a peer-to-peer (or distributed) network environment.

In one implementation, computer system 101 comprises a processor or central processing unit (CPU) 104 coupled to one or more non-transitory computer-readable media 106

(e.g., computer storage or memory), display device 108 (e.g., monitor) and various input devices 110 (e.g., mouse or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 106. In particular, the present techniques may be implemented by a segmentation unit 107. Non-transitory computer-readable media 106 may include random access memory (RAM), read-only memory (ROM), magnetic floppy disk, flash memory, and other types of memories, or a combination thereof. The computer-readable program code is executed by CPU 104 to process images (e.g., MR or CT images) acquired by, for example, imaging device 102 (e.g., MR or CT scanner). As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 106 may be used for storing image datasets, segmentation instructions, knowledge base, individual patient data, database of previously treated patients (e.g., training data), and so forth. Such data may also be stored in external storage or other memories. The external storage may be implemented using a database management system (DBMS) managed by the CPU 104 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging device 102 may be a radiology scanner, such as a magnetic resonance (MR) scanner or a CT scanner, for acquiring image data. The workstation 103 may include a computer and appropriate peripherals, such as a keyboard and display device, and can be operated in conjunction with the entire system 100. For example, the workstation 103 may communicate with the imaging device 102 so that the image data collected by the imaging device 102 can be rendered at the workstation 103 and viewed on a display device.

The workstation 103 may communicate directly with the computer system 101 to display processed image data and/or output image processing results (e.g., labeled images). The workstation 103 may include a graphical user interface to receive user input via an input device (e.g., keyboard, mouse, touch screen voice or video recognition interface, etc.) to manipulate visualization and/or processing of the image data. For example, the user may view the segmented image data, and specify one or more view adjustments or preferences (e.g., zooming, panning, rotating, changing contrast, changing color, changing view angle, changing view depth, changing rendering or reconstruction technique, etc.), navigate to a particular region of interest by specifying a "goto" location, and so forth.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
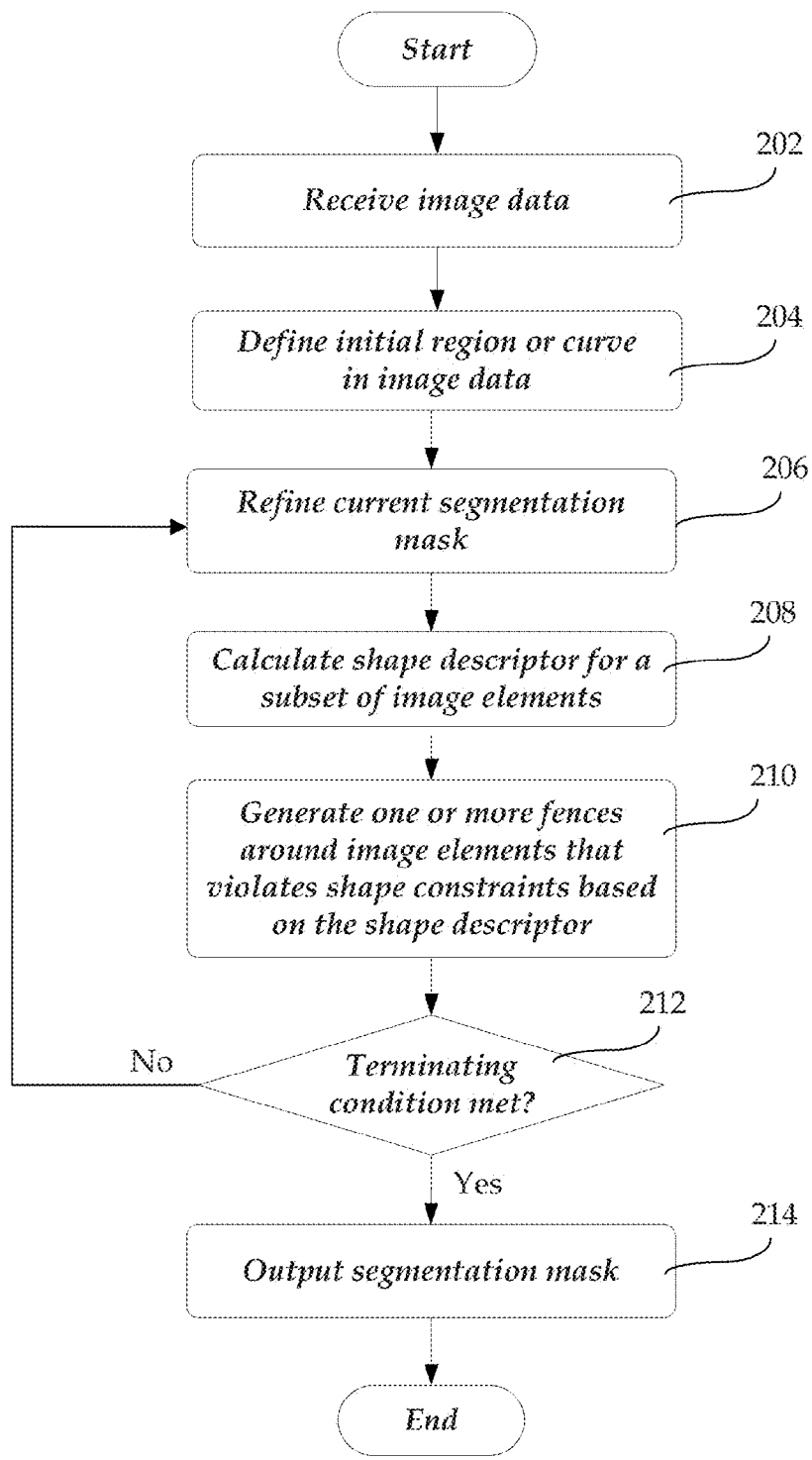
FIG. 2 shows an exemplary method of segmentation.

FIG. 2 shows an exemplary method 200 of segmentation performed by a computer system. It should be understood that the steps of the method 200 may be performed in the order shown or a different order. Additional, different, or fewer steps may be provided. Further, the method 200 may be implemented with the system 101 of FIG. 1, a different system, or a combination thereof.

At 202, the segmentation unit 107 receives image data. The image data may include current patient image data of an object of interest (e.g., liver, lung, vertebra, colon, heart, etc.) that is currently being segmented. The image data may be extracted from a volumetric image dataset. The volumetric image dataset may be stored in Digital Imaging and Communications in Medicine (DICOM) format. Any other digital file format may also be used. The image data may be received from, for example, a storage device, a database system or an archiving system, such as a picture archiving and communication (PACS) system. In addition, the image data may be acquired by an imaging device using modalities such as magnetic resonance (MR) imaging, computed tomography (CT), helical CT, x-ray, positron emission tomography (PET), PET-CT, fluoroscopy, ultrasound, single-photon emission computed tomography (SPECT), SPECT-CT, MR-PET, etc. Further, the image data may also be derived from originally acquired image data, such as Maximum Intensity Projection (MaxIP) images, Minimum Intensity Projection (MinIP) images, filtered images, and so forth. Even further, the image data may be two-dimensional, three-dimensional, or four-dimensional.

At 204, the segmentation unit 107 defines an initial region or curve of a current segmentation mask associated with the object of interest in the image data. The initial region or curve can be placed on the image data automatically or through user interaction. For instance, the segmentation unit 107 may automatically place the initial region or curve on the image at a portion of the image having the brightest intensity, or by detecting some other feature. The segmentation unit 107 may also accept a user selection of one or more points on the image as initial seed points. The user may make the selection via a user interface at, for example, workstation 103 by clicking or tapping on the image with an input device (e.g., mouse, touchpad, touchscreen, etc.). The segmentation unit 107 may then form the initial region or curve around the seed points selected by the user.

At 206, the segmentation unit 107 refines the current segmentation mask associated with the object of interest being segmented. The current segmentation mask is set to the initial region or curve at the first iteration of segmentation, and iteratively refined while excluding any image element associated with a fence. "Fences" will be described in more detail with reference to step 210. The segmentation mask includes image elements (e.g., pixels or voxels) that are similar with respect to some characteristic or property, such as color, intensity or texture.

In some implementations, region growing is performed to refine the current segmentation mask. Region growing may be performed by adding neighboring image elements to the current segmentation mask that have features (e.g., intensity values, gray level texture, color, etc.) that are similar to the image elements in the current segmentation mask. The region growing excludes any image elements that are associated with any fence generated by step 210 in a previous iteration. For instance, if a subject voxel at the boundary of the current segmentation mask is not associated with any previously generated fences and the difference between the subject voxel's intensity value and the mean intensity value of the current region is less than a predetermined threshold value, the subject voxel is incorporated into the current segmentation mask.

In some implementations, curve evolution (or propagation) is performed to refine the current segmentation mask. Curve evolution may be performed by refining an initial curve (or snake) towards the lowest potential of a cost function, subject to shape constraints imposed by the fences. The curve evolution excludes any image elements that are associated with any fence generated by step 210 in a previous iteration. For instance, the cost function can be set high at the fence so that the curve cannot go beyond the fence.

At 208, the segmentation unit 107 calculates a shape descriptor for a subset of voxels in the current region. The shape descriptor may be, for example, a Gauss Map (GM), a Gaussian Linking Integrand (GLI), a shape context, or any other measure that describes the shape of the current region. The shape descriptor allows the segmentation unit 107 to determine if a subject voxel violates shape constraints in step 210. The subset of voxels where the shape descriptor is calculated may be limited to those located at the boundary of the current region where the growth has currently stopped (i.e. boundary voxels). The boundary voxels may be divided into multiple subsets of voxels for which multiple shape descriptors may be computed.

Figure 3A:
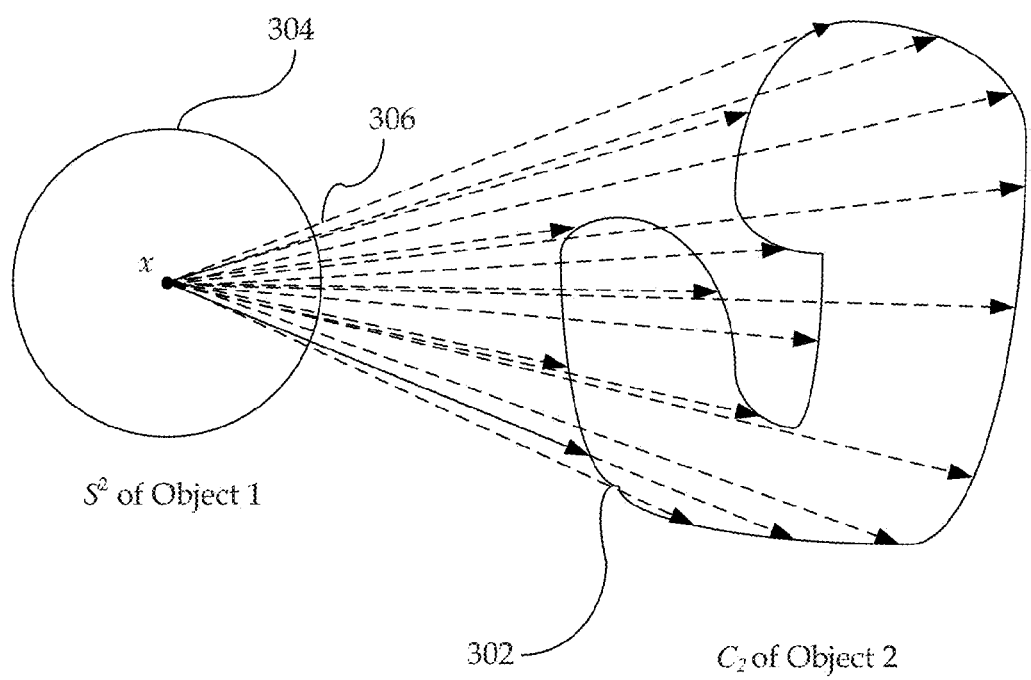
FIGS. 3a-b illustrate the generation of a shape descriptor.
Figure 3B:
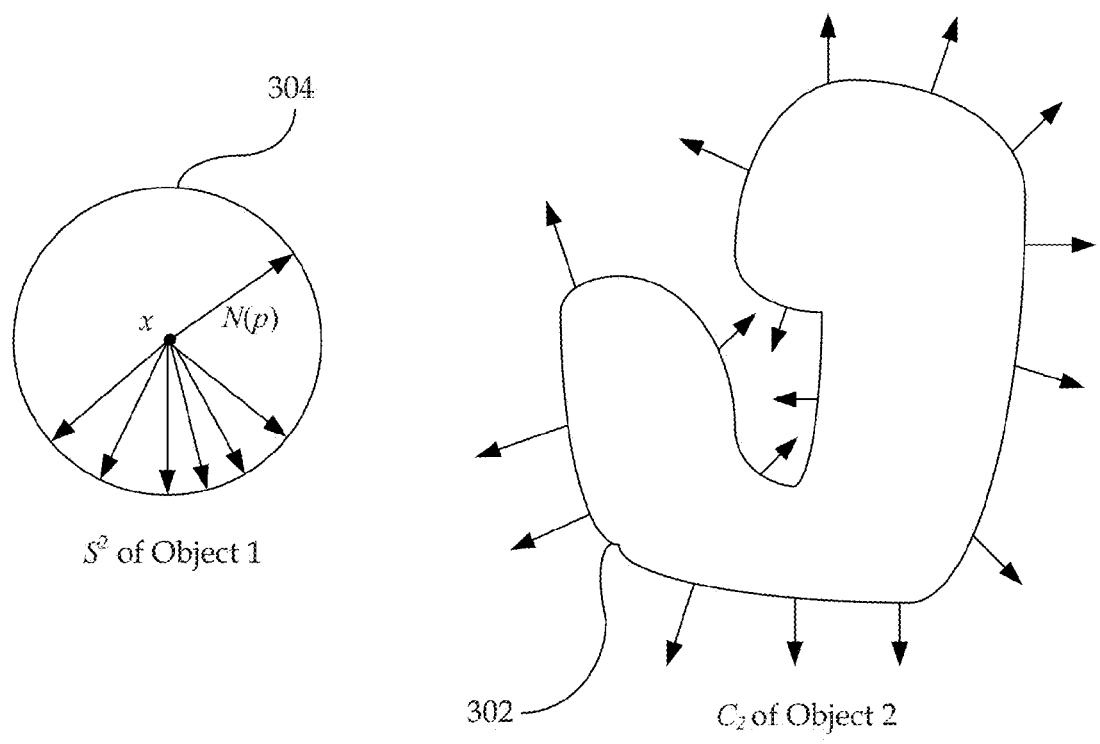

FIGS. 3a-b illustrate the generation of a shape descriptor from a subset of boundary voxels. The point x represents a subject boundary voxel of Object 1, while the curve $C_2$ represents a curvilinear segment of a boundary of Object 2. Shape descriptors (e.g., GM, GLI, shape context, etc.) may be computed from subject voxel x for the current region and the shape prior for comparison. As discussed previously, a "shape prior" generally refers to knowledge of a partial or entire predicted shape that is used to constrain the image segmentation method, such as the probability distribution of measurements (e.g., area, perimeter, etc.). The shape prior can be defined based upon prior knowledge of a shape of a specific object class or a geometric property of an object. The shape prior may be based on, for example, a geometric shape (e.g., tube, rectangle, square, ellipse, circle, etc.).

Each shape descriptor describes how Object 2 ($C_2$) looks like when viewed from each point x of Object 1. Object 1 and Object 2 may be associated with the same object or different objects. In some implementations, both Objects 1 and 2 are associated with the same object of interest (e.g., liver) when computing shape descriptors for a current region or a shape prior. Alternatively, Objects 1 and 2 may be associated with the object of interest and another object in the vicinity of the object of interest. For example, assuming that the object of interest is the liver, the shape descriptor of a shape prior may be determined based on both the liver (as Object 1) and lung (as Object 2) in prior patient image dataset (i.e. prior knowledge). Similarly, the shape descriptor of a current region may be determined based on both the liver (as Object 1) and lung (as Object 2) in current patient image data (i.e. patient data that is currently being segmented). In other words, the shape descriptor of each point of a segmented liver may be calculated using both the point of the liver and the surface of the lung. If the lung looks very different from the shape prior when viewed from the point x of the liver, then the point x may be wrongly located, so the fences should be built around it.

A Gauss Map (GM) provides a mapping from each voxel on the curve $C_2$ (302) to a corresponding point on a unit sphere $S^2$ (304) centered at x. Referring to FIG. 3a, given a curve $C_2$ (302) lying in $R^3$, the Gauss map may be a continuous map d: $C_2 \rightarrow S^2$ such that d(p) is a unit vector in the direction of a line 306 connecting x to each point on $C_2$. Alternatively, as shown in FIG. 3b, the Gauss map may be a continuous map N: $C_2 \rightarrow S^2$ such that N(p) is a unit vector orthogonal to $C_2$ at p, namely the normal vector to $C_2$ at p. It should be appreciated that $C_2$ is not limited to a curve. It can be, for example, a surface or volume.

A GLI may be computed from the Gauss map T of d(p). The GLI describes the linking of two closed curves in three-dimensional space. More particularly, the GLI encodes how two curves wind around each other. Given two non-intersecting differentiable curvilinear segments $\gamma_1, \gamma_2:C_2 \rightarrow R^3$ along the boundary of the current region of segmentation, the generalized GLI may be defined by $$g = \frac{1}{4\pi \|f\|^n} (d\gamma_1 \times d\gamma_2)(f), \qquad (1)$$

wherein x is a vector product, ( )( ) is a dot product, and f is a function of $\gamma_1$ and $\gamma_2$. When $f=\gamma_1-\gamma_2$ and n=3, the integral $\iint g$ becomes the Gaussian Linking Integral, and is invariant regardless of geometrical deformations of $\gamma_1$ and $\gamma_2$. In some instances, we may use $f=\gamma_1+\gamma_2$ and n=1, 2, 3 . . . . It should be appreciated that $\gamma_1$ and $\gamma_2$ are not limited to curves. They can be, for example, surfaces and volumes. The GLI may be calculated for each pair of small curvilinear segments $d\gamma_1$ and $d\gamma_2$ along the boundary $C_2$ of the current region. The curvilinear segments may be connected and grouped according to the g values to reconstruct vessels and other objects of interest in the image data.

A shape context is a feature descriptor that allows for measuring shape similarity. For a subject boundary voxel $x_i$, the histogram of the relative coordinates of the remaining n−1 voxels of the boundary $C_2$ is:

$$h_i(k) = \#\{ \neq x_i : (q-x_i) \in \mathrm{bin}(k) \} \qquad (2)$$

wherein the boundary $C_2$ is approximated by n points. In other words, shape context is provided by the histogram of the relative coordinates of all the other control voxels around the same object. The shape contexts for all boundary voxels of both the current region and the shape prior may be calculated.

Referring back to FIG. 2, at 210, the segmentation unit 107 generates one or more fences around boundary voxels that violate shape constraints. To generate the fences, boundary voxels of the current region that violate shape constraints are first identified. Next, fences are generated around such boundary voxels to exclude neighboring voxels in the segmentation refinement step 206.

Shape constraints are violated if the shape descriptor associated with the subject voxel is substantially different from the shape descriptor of a shape prior (i.e., difference is more than a predetermined threshold value). To identify boundary voxels that violate shape constraints, the local coordinate systems of the shape descriptors for the current region and the shape prior may first be aligned. For example, the local coordinate systems of two spheres $S_2$ corresponding to the Gauss Maps of the current region and the shape prior may be aligned.

Various methods may be used to define the local coordinate system on each sphere $S_2$. In some implementations, a first axis of the local coordinate system is defined along the longitudinal axis of a cylindrical shape that approximates the boundary of the current region or shape prior. A second axis of the local coordinate system may be defined along a line connecting the center of the base circle of the cylindrical shape and the point x, while a third axis may be defined as perpendicular to both the first and second axes. Alternatively, the normal vector of the boundary at point x may be defined as the first axis, while the tangent vector at point x may be defined as the second axis. Since there may be many tangent vectors, a tangent vector that minimizes the difference between the Gauss Maps of the current region and the shape prior may be selected to define the second axis. The third axis may be defined as perpendicular to both the first and second axes.

After aligning the local coordinate systems of the shape descriptors associated with the current region and the shape prior, the difference between the shape descriptors may be calculated. In some implementations, the difference is calculated by binning the spheres $S_2$ into smaller areas separated by longitudinal and latitudinal lines, similar to a terrestrial globe. The difference between the shape descriptors may be calculated based on the difference between the bins associated with the current object and the shape prior. If the difference between the shape descriptors is more than a predetermined threshold, the subject voxel is determined to violate shape constraints.

Once the subject voxel is determined to violate shape constraints, a "fence" is generated around the subject voxel. A "fence" generally refers to a set of pixels or voxels that are within a predetermined shape (e.g., rectangle, ellipse, circle, etc.) surrounding (e.g., centered at) a boundary voxel that violates shape constraints. Pixels or voxels within the fences are assigned special values to prevent the segmentation mask from growing inside the fences at step 206. The fence is advantageously useful in preventing or minimizing segmentation leakage, which may not be avoided if the segmentation excludes only voxels that violate shape constraints. To illustrate this point, suppose that a vessel near a bone is segmented, and that both the vessel and bone have similar intensity values. Even when most of the pixels representing the bone are rejected, if there is a single pixel allowed into the vessel segmentation mask, the segmentation mask may grow into the bone, thereby giving rise to segmentation leakage or bleeding artifacts. To prevent such leakage problems, one or more fences are generated to exclude neighboring voxels (or pixels) concordantly from the segmentation mask. In other words, the current region cannot grow beyond the fenced area.

For example, in the case of a blood vessel, it is generally known to be a tubular structure with some bifurcating portions. The shape prior may be predefined as a tubular shape to constrain the segmentation. The GM or GLI of pixels at the growing boundary should be concentrated in the direction of the tube. If the GM or GLI is distributed far away from this direction, it indicates there is likely a segmentation leakage. Fences are built around boundary pixels P that violate shape constraints (i.e., substantially different GM or GLI from the shape prior) to prevent such leakage. Each fence may be defined by, for example, a rectangular area of width and height of 3 pixels, centered at P, parallel to the tubular direction and perpendicular to the normal direction. Other geometric shapes, such as circle, oval or sphere, may also be used to define each fence.

At 212, the segmentation unit 107 checks to see if the terminating condition is met. The terminating condition may be met if there are no more voxels or pixels that can be added to the current region. If the terminating condition is not met, steps 206-212 may be repeated to iteratively grow the current region to generate the segmentation mask. If the terminating condition is met, the method 200 continues at 214.

At 214, the segmentation unit 104 outputs the segmentation mask. The segmentation mask may be, for example, presented at workstation 103 and/or stored for future retrieval.

Figure 4:
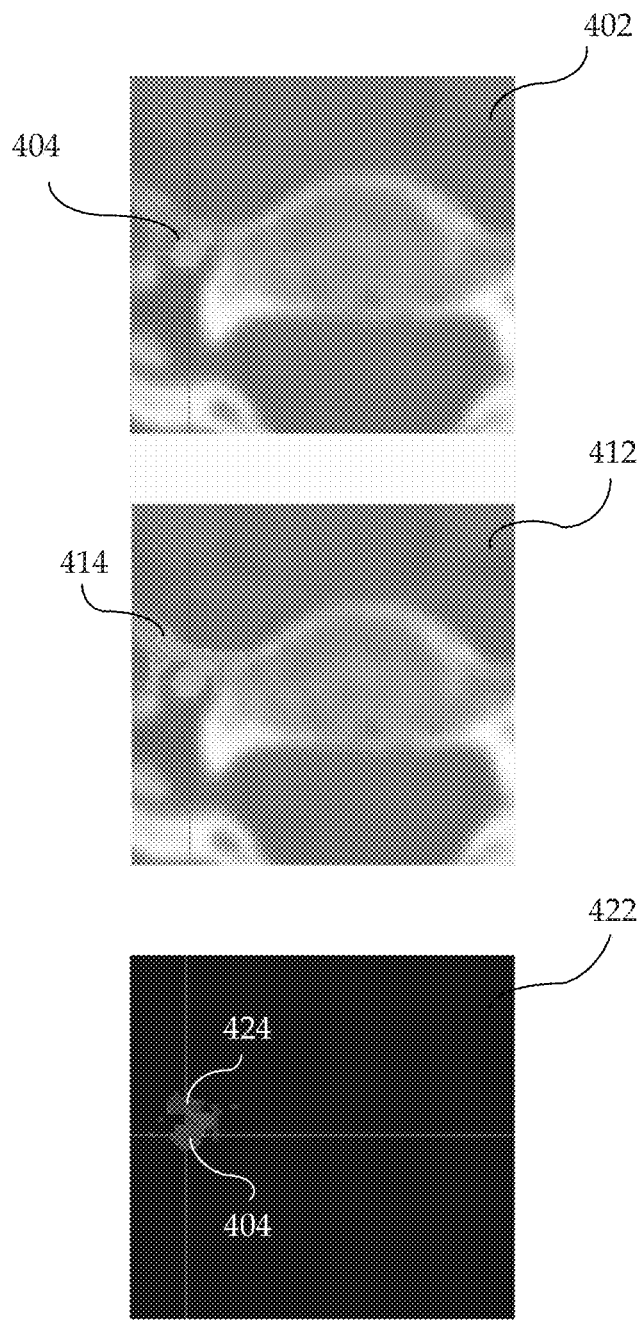
FIG. 4 illustrates an exemplary segmentation of a vertebral artery with and without fences.

FIG. 4 illustrates an exemplary segmentation of a vertebral artery with and without fences. More particularly, image 402 shows segmentation with fences and image 412 shows segmentation without fences. Image 422 shows the fences 424 that were set up outside the segmentation mask 404 in image 402 to constrain the segmentation in accordance with the present framework. As illustrated by image 402, the segmentation mask 404 was constrained by the fences, resulting in no leakage artifacts outside the vertebral artery. In contrast, no fences were set up in image 412, and the segmentation mask 414 leaked outside the vertebral artery into the neighboring bone region.

Figure 5:
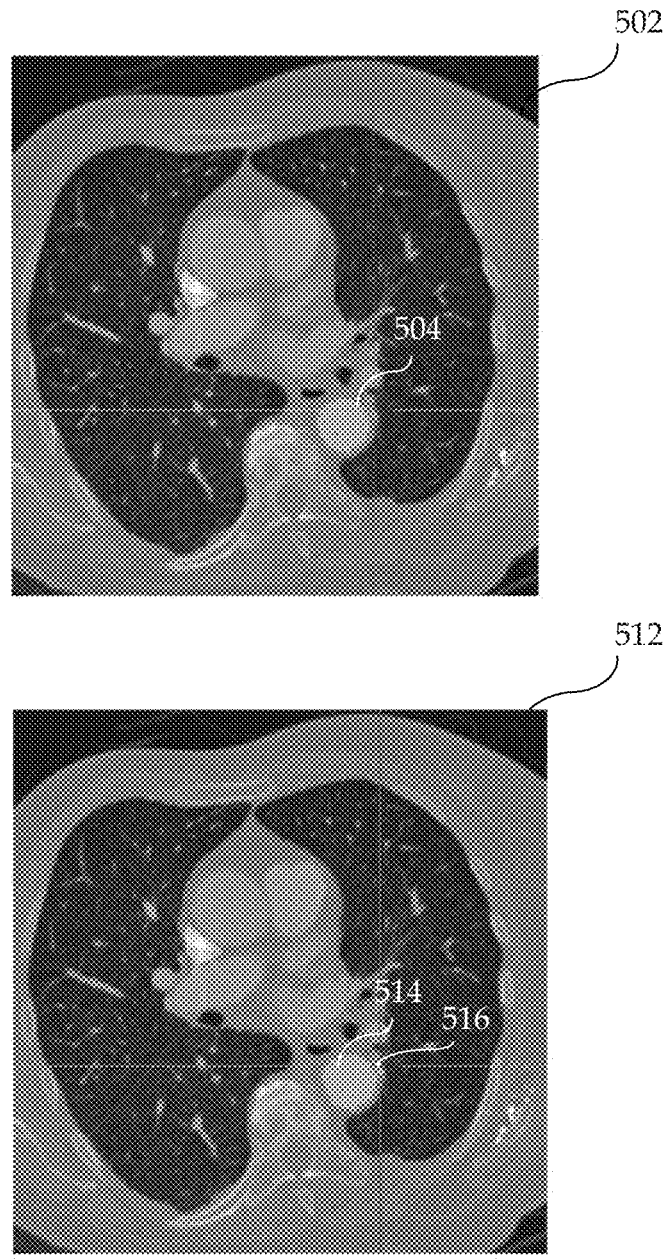
FIG. 5 illustrates an exemplary segmentation of a large vessel (descending aorta) with and without fences.

FIG. 5 illustrates an exemplary segmentation of a large vessel (descending aorta) with and without fences. More particularly, image 502 shows segmentation with fences and image 512 shows segmentation without fences. As illustrated by image 502, the segmentation mask 504 was constrained by the fences, resulting in no leakage artifacts outside the vessel. In contrast, no fences were set up in image 512, and the segmentation mask 514 leaked outside the vessel into the neighboring vertebral region, as evidenced by artifact 516.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A method of image segmentation performed by a computer system, comprising:
   (i) refining a current segmentation mask associated with an object of interest and excluding, from the current segmentation mask, any image element associated with a previously generated fence;
   (ii) calculating a first shape descriptor for a subset of image elements of the current segmentation mask;
   (iii) selecting one or more image elements of the current segmentation mask that violate a shape constraint by comparing the first shape descriptor to a second shape descriptor of a shape prior;
   (iv) generating one or more fences around the selected one or more image elements; and
   (v) repeating at least steps (i), (ii), (iii) and (iv) until a terminating condition is met;
   wherein the first shape descriptor is calculated based on the object of interest and another object in the vicinity of the object of interest in current patient image data.

2. The method of claim 1 further comprising defining an initial region and setting the current segmentation mask to the initial region.

3. The method of claim 2 wherein refining the current segmentation mask comprises performing region growing.

4. The method of claim 1 further comprising defining an initial curve and setting the current segmentation mask to the initial curve.

5. The method of claim 4 wherein refining the current segmentation mask comprises performing curve evolution.

6. The method of claim 1 wherein calculating the first shape descriptor for the subset of image elements of the current segmentation mask comprises calculating a Gauss Map.

7. The method of claim 1 wherein calculating the first shape descriptor for the subset of image elements of the current segmentation mask comprises calculating a Gaussian Linking Integrand.

8. The method of claim 1 wherein calculating the first shape descriptor for the subset of image elements of the current segmentation mask comprises calculating a shape context.

9. The method of claim 1 wherein the shape prior is based on a geometric shape.

10. The method of claim 1 wherein generating the one or more fences around the selected one or more image elements comprises defining a geometric shape centered at one of the selected one or more image elements.

11. The method of claim 1 further comprising calculating the second shape descriptor based on the object of interest and another object in the vicinity of the object of interest in prior patient image dataset to calculate the shape prior.

12. A system for facilitating image segmentation, comprising: a non-transitory memory device for storing computer readable program code; and a processor in communication with the memory device, the processor being operative with the computer readable program code to:
 (i) refine a current segmentation mask associated with an object of interest and excluding, from the current segmentation mask, any image element associated with a previously generated fence;
 (ii) select one or more image elements of the current segmentation mask that violate a shape constraint by comparing a first shape descriptor of the one or more image elements to a second shape descriptor of a shape prior;
 (iii) generate one or more fences around the selected one or more image elements; and
 (iv) repeat at least steps (i), (ii) and (iii) until a terminating condition is met;
 wherein the first shape descriptor is calculated based on the object of interest and another object in the vicinity of the object of interest in current patient image data.

13. The system of claim 12 wherein the processor is operative with the computer readable program code to refine the current segmentation mask by performing region growing.

14. The system of claim 12 wherein the processor is operative with the computer readable program code to refine the current segmentation mask by performing curve evolution.

15. The system of claim 12 wherein the first and second shape descriptors comprise Gauss Maps.

16. The system of claim 12 wherein the first and second shape descriptors comprise Gaussian Linking Integrands.

17. The system of claim 12 wherein the first and second shape descriptors comprise shape contexts.

18. A non-transitory computer readable medium embodying a program of instructions executable by machine to perform steps for facilitating image segmentation, the steps comprising:
 (i) refining a current segmentation mask associated with an object of interest and excluding, from the current segmentation mask, any image element associated with a previously generated fence;
 (ii) selecting one or more image elements of the current segmentation mask that violate a shape constraint by comparing a first shape descriptor of the one or more image elements to a second shape descriptor of a shape prior;
 (iii) generating one or more fences around the selected one or more image elements; and
 (iv) repeating at least steps (i), (ii) and (iii) until a terminating condition is met;
 wherein the first shape descriptor is calculated based on the object of interest and another object in the vicinity of the object of interest in current patient image data.

19. The non-transitory computer readable medium of claim 18 wherein the first and second shape descriptors comprise a Gauss Map, a Gaussian Linking Integrand or a shape context.

* * * * *